United States Patent [19]
Barak

[11] Patent Number: 5,946,139
[45] Date of Patent: Aug. 31, 1999

[54] COMPACT MONITOR

[75] Inventor: Shlomo Barak, Rishon le Zion, Israel

[73] Assignee: Unic View Ltd., Netanya, Israel

[21] Appl. No.: 09/056,106

[22] Filed: Apr. 6, 1998

[51] Int. Cl.⁶ .................................................. G02B 27/10
[52] U.S. Cl. ........................ 359/618; 359/629; 359/831; 359/833; 359/671; 359/465
[58] Field of Search ..................... 359/618, 629, 359/634, 636, 639, 640, 290, 291, 831, 833, 671, 463, 464, 465, 466

[56] References Cited

U.S. PATENT DOCUMENTS

| | | | |
|---|---|---|---|
| 5,459,611 | 10/1995 | Bohn et al. | 359/618 |
| 5,485,310 | 1/1996 | Inada | 359/629 |
| 5,575,548 | 11/1996 | Lee | 359/465 |
| 5,796,526 | 8/1998 | Anderson | 359/671 |

Primary Examiner—Loha Ben
Attorney, Agent, or Firm—Abelman, Frayne & Schwab

[57] ABSTRACT

A color display including a non-polarized light source, at least one polarizing beam-splitter receiving light from the non-polarized light source, at least one selectably actuable polarization rotating light valve having thereon impinging light from the polarizing beam splitter and operating in a reflective mode, the light valve having a plurality of separately controlled light valve regions which correspond to different colors, a display screen including a plurality of differently colored light impingement regions and imaging optics for directing light reflected from the at least one light valve via the at least one beam-splitter to the display screen such that light from individual ones of the plurality of separately controlled light valve regions which correspond to a given color impinges on correspondingly colored light impingement regions of the display screen.

20 Claims, 8 Drawing Sheets

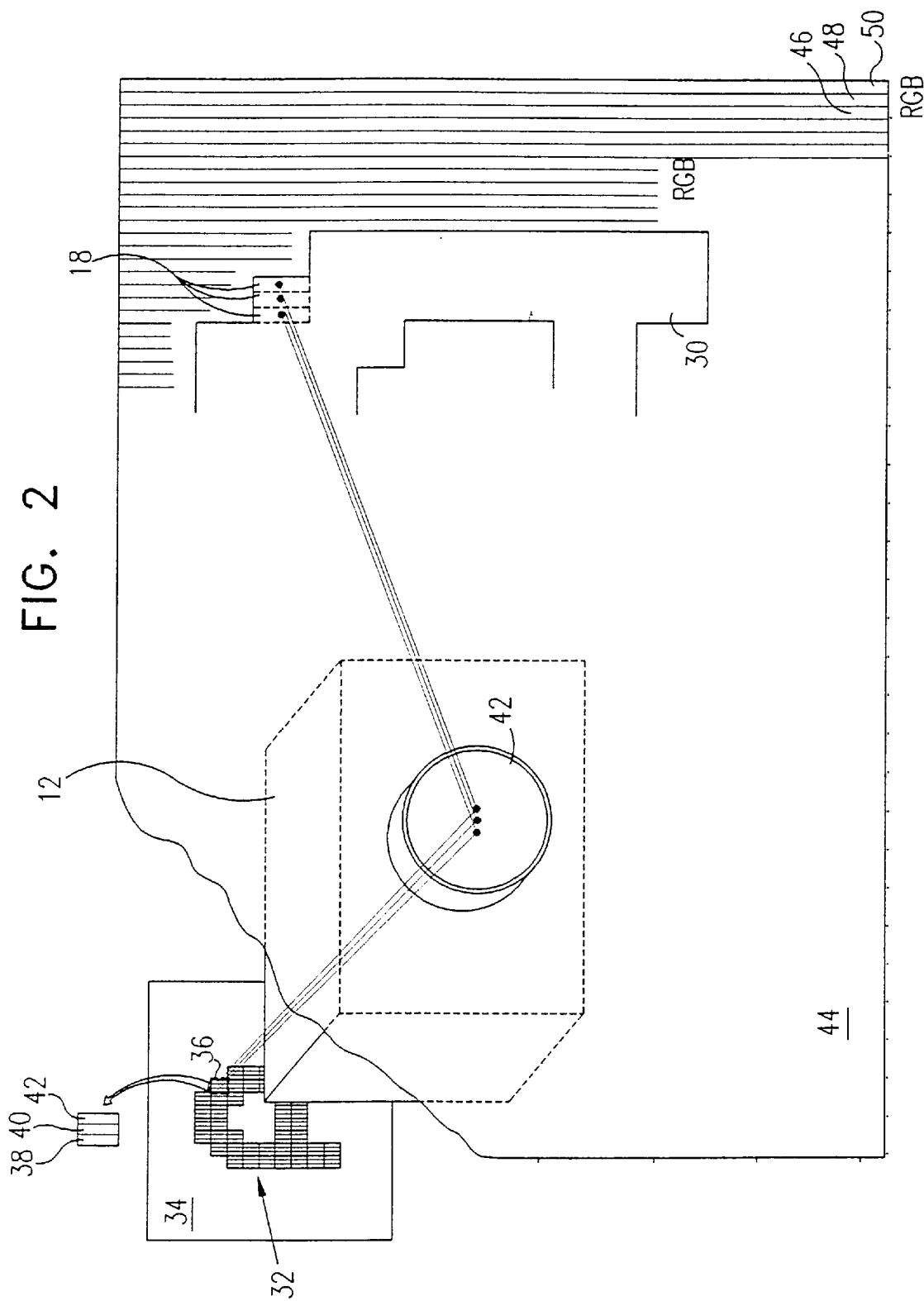

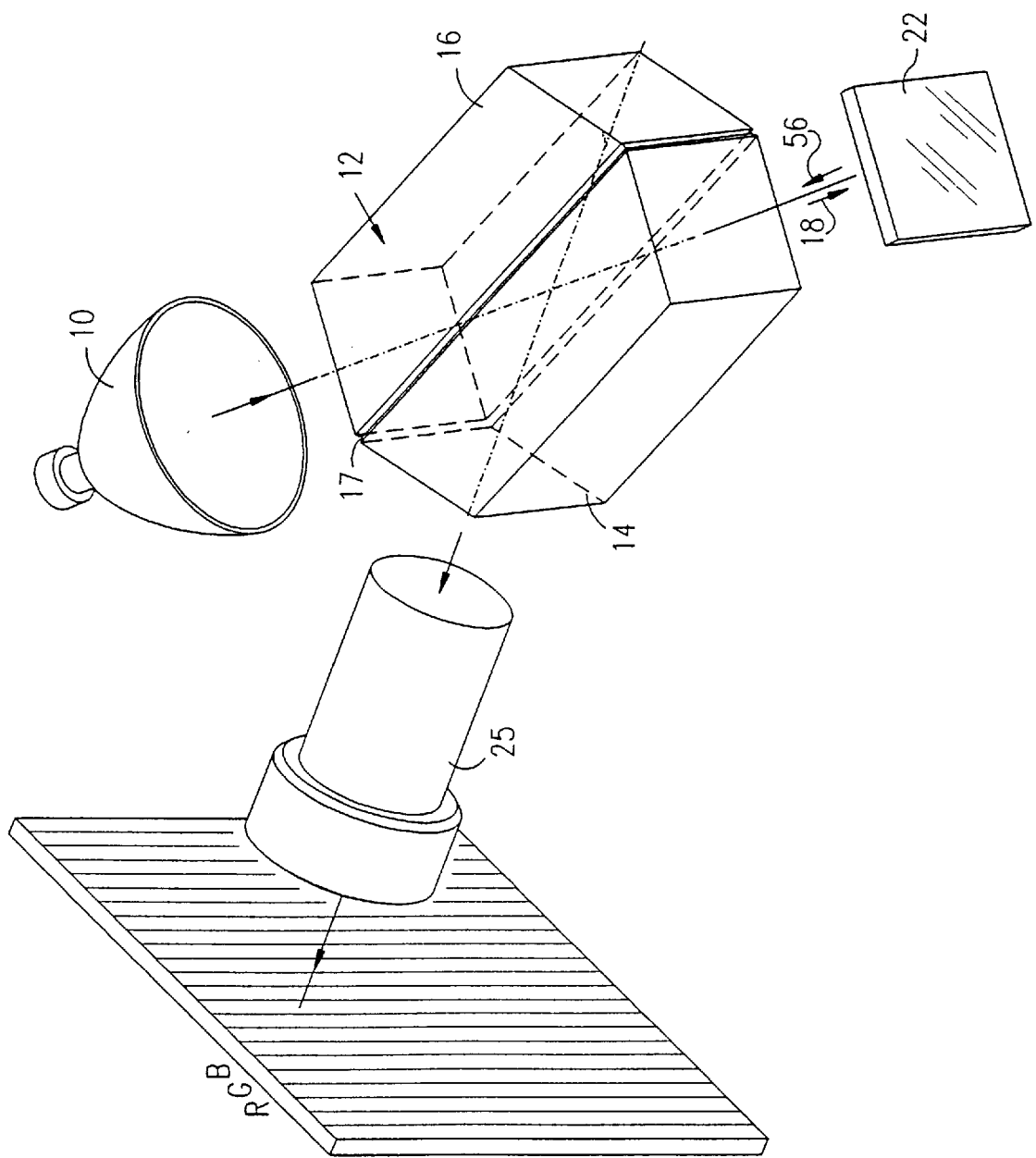

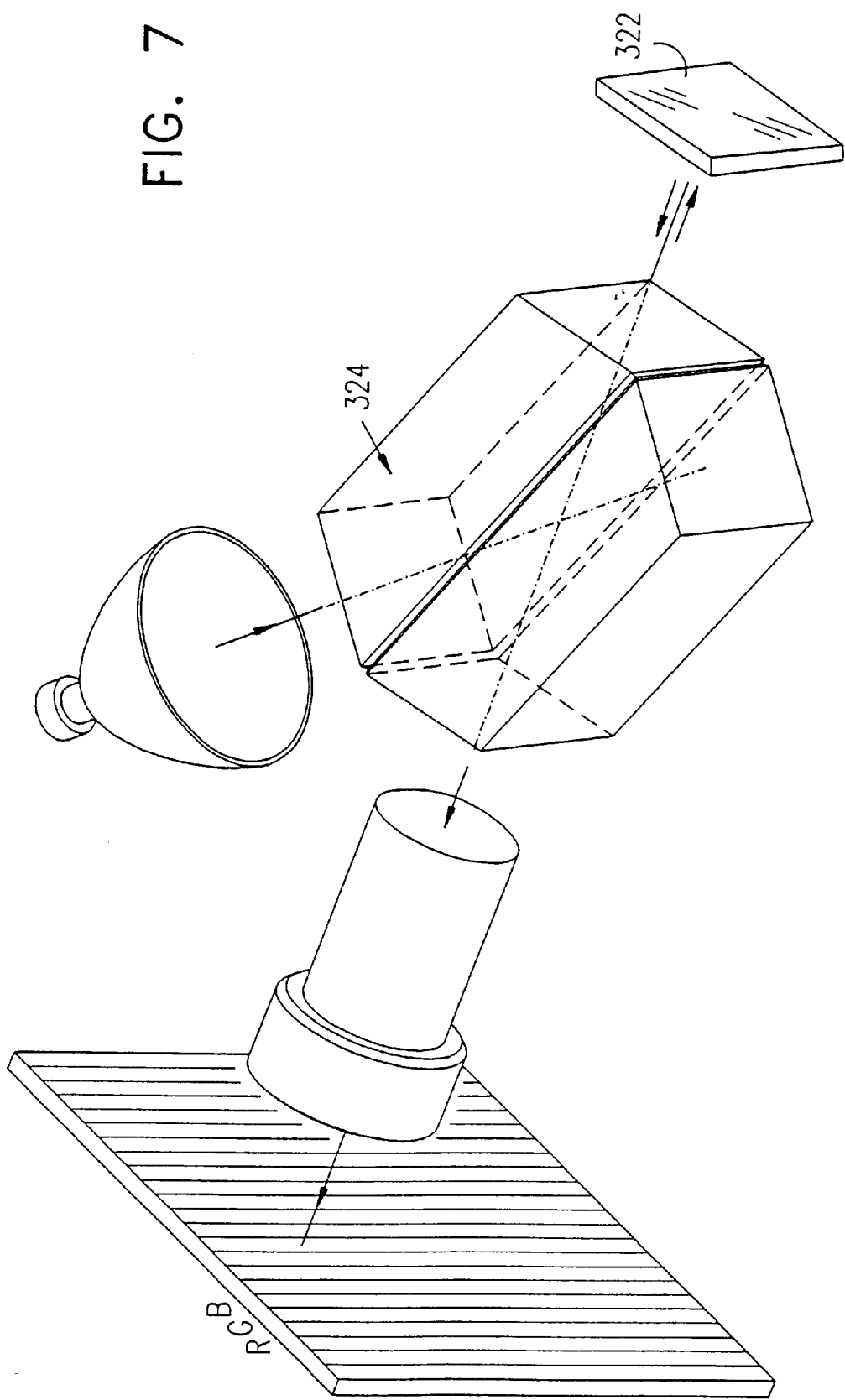

5,946,139

COMPACT MONITOR

FIELD OF THE INVENTION

The present invention relates to displays generally and more particularly to displays useful in monitors and television receivers.

BACKGROUND OF THE INVENTION

Cathode ray tube displays have been known for over one hundred years. They have found extremely wide application in all types of displays, including television receivers and monitors. Cathode ray tubes have known disadvantages of large size and weight, fragility and relatively high cost and perceived disadvantages of radiation emission.

Thin panel displays, such as liquid crystal displays, have been known for many years. Until quite recently, liquid crystal devices lacked the resolution and quality to enable them to be used as high quality color displays. Currently available liquid crystal displays are not cost effective in large sizes.

SUMMARY OF THE INVENTION

The present invention seeks to provide an improved color display which overcomes disadvantages of cathode ray tubes and liquid crystal displays.

There is thus provided, in accordance with a preferred embodiment of the present invention, a color display including a non-polarized light source, at least one polarizing beam-splitter receiving light from the non-polarized light source, at least one selectably actuable polarization rotating light valve having impinging thereon light from the polarizing beam splitter and operating in a reflective mode, the light valve having a plurality of separately controlled light valve regions which correspond to different colors, a display screen including a plurality of differently colored light impingement regions and imaging optics for directing light reflected from the at least one light valve via the at least one beam-splitter to the display screen such that light from individual ones of the plurality of separately controlled light valve regions which correspond to a given color impinges on correspondingly colored light impingement regions of the display screen.

Further, in accordance with a preferred embodiment of the present invention the imaging optics is operative to direct polychromatic light reflected from the at least one light valve via the at least one beam-splitter to the display screen such that polychromatic light from individual ones of the plurality of separately controlled light valve regions which correspond to a given color impinges on correspondingly colored light impingement regions of the display screen.

Additionally, in accordance with a preferred embodiment of the present invention the at least one polarizing beam-splitter includes a single polarizing beam-splitter, the at least one selectably actuable polarization rotating light valve includes a single selectably actuable polarization rotating light valve, the single polarizing beam-splitter directs light of a first polarity to the single selectably actuable polarization rotating light valve and directs light of a second polarity to a mirror, the mirror reflects the light of the second polarity to the polarizing beam-splitter which directs it back to the light source, and the light source at least partially depolarizes the light of the second polarity.

Alternatively, the polarizing beam-splitter transmits light of a first polarity to the selectably actuable polarization rotating light valve and reflects light of a second polarity to the mirror, and the polarizing beam-splitter reflects light from the mirror to the light source.

Still further, in accordance with a preferred embodiment of the present invention the at least one polarizing beam-splitter includes a single polarizing beam-splitter, the at least one selectably actuable polarization rotating light valve includes a single selectably actuable polarization rotating light valve, the single polarizing beam-splitter directs light of a first polarity to the single selectably actuable polarization rotating light valve and directs light of a second polarity to a mirror, the mirror reflects the light of the second polarity to the polarizing beam-splitter which directs it back to the light source, and the light source at least partially depolarizes the light of the second polarity.

Additionally, in accordance with a preferred embodiment of the present invention the polarizing beam-splitter transmits light of a first polarity to the selectably actuable polarization rotating light valve and reflects light of a second polarity to the mirror, and the polarizing beam-splitter reflects light from the mirror to the light source.

Furthermore, in accordance with a preferred embodiment of the present invention the polarizing beam-splitter reflects light of a first polarity to the selectably actuable polarization rotating light valve and reflects light of a second polarity to the mirror, and the polarizing beam-splitter reflects light from the mirror to the light source.

Additionally, in accordance with a preferred embodiment of the present invention the at least one polarizing beam-splitter includes a single polarizing beam-splitter, the at least one selectably actuable polarization rotating light valve includes a single selectably actuable polarization rotating light valve, the polarizing beam-splitter transmits light of a first polarity to the selectably actuable polarization rotating light valve and reflects light of a second polarity to the mirror, and the polarizing beam-splitter reflects light from the mirror to the light source.

Moreover, in accordance with a preferred embodiment of the present invention the at least one polarizing beam-splitter includes a single polarizing beam-splitter, the at least one selectably actuable polarization rotating light valve includes a single selectably actuable polarization rotating light valve, the polarizing beam-splitter reflects light of a first polarity to the selectably actuable polarization rotating light valve and transmits light of a second polarity to the mirror, and the polarizing beam-splitter transmits light from the mirror to the light source.

There is also provided, in accordance with a preferred embodiment of the present invention, a color display method includes the steps of directing light from a non-polarized light source via at least one polarizing beam-splitter onto at least one selectably actuable polarization rotating light valve having impinging thereon light from the polarizing beam splitter and operating in a reflective mode, the light valve having a plurality of separately controlled light valve regions which correspond to different colors, and directing light reflected from the at least one light valve via the at least one beam-splitter to a display screen including a plurality of differently colored light impingement regions such that light from individual ones of the plurality of separately controlled light valve regions which correspond to a given color impinges on correspondingly colored light impingement regions of the display screen.

Further, in accordance with a preferred embodiment of the present invention the polychromatic light is reflected from the at least one light valve via the at least one beam-splitter to the display screen such that polychromatic light from individual ones of the plurality of separately controlled light valve regions which correspond to a given color impinges on correspondingly colored light impingement regions of the display screen.

Still further, in accordance with a preferred embodiment of the present invention the at least one polarizing beam-splitter includes a single polarizing beam-splitter, the at least one selectably actuable polarization rotating light valve includes a single selectably actuable polarization rotating light valve, the single polarizing beam-splitter directs light of a first polarity to the single selectably actuable polarization rotating light valve and directs light of a second polarity to a mirror, the mirror reflects the light of the second polarity to the polarizing beam-splitter which directs it back to the light source, and the light source at least partially depolarizes the light of the second polarity.

Alternatively, the polarizing beam-splitter transmits light of a first polarity to the selectably actuable polarization rotating light valve and reflects light of a second polarity to the mirror, and the polarizing beam-splitter reflects light from the mirror to the light source.

Still further, in accordance with a preferred embodiment of the present invention the at least one polarizing beam-splitter includes a single polarizing beam-splitter, the at least one selectably actuable polarization rotating light valve includes a single selectably actuable polarization rotating light valve, the single polarizing beam-splitter directs light of a first polarity to the single selectably actuable polarization rotating light valve and directs light of a second polarity to a mirror, the mirror reflects the light of the second polarity to the polarizing beam-splitter which directs it back to the light source, and the light source at least partially depolarizes the light of the second polarity.

Additionally, in accordance with a preferred embodiment of the present invention the at least one polarizing beam-splitter includes a single polarizing beam-splitter, the at least one selectably actuable polarization rotating light valve includes a single selectably actuable polarization rotating light valve, the polarizing beam-splitter transmits light of a first polarity to the selectably actuable polarization rotating light valve and reflects light of a second polarity to the mirror, and the polarizing beam-splitter reflects light from the mirror to the light source.

Alternatively, the polarizing beam-splitter reflects light of a first polarity to the selectably actuable polarization rotating light valve and transmits light of a second polarity to the mirror, and the polarizing beam-splitter transmits light from the mirror to the light source.

Moreover, in accordance with a preferred embodiment of the present invention the at least one polarizing beam-splitter includes a single polarizing beam-splitter, the at least one selectably actuable polarization rotating light valve includes a single selectably actuable polarization rotating light valve, the polarizing beam-splitter transmits light of a first polarity to the selectably actuable polarization rotating light valve and reflects light of a second polarity to the mirror, and the polarizing beam-splitter reflects light from the mirror to the light source.

Additionally, in accordance with a preferred embodiment of the present invention the at least one polarizing beam-splitter includes a single polarizing beam-splitter, the at least one selectably actuable polarization rotating light valve includes a single selectably actuable polarization rotating light valve, the polarizing beam-splitter transmits light of a first polarity to the selectably actuable polarization rotating light valve and reflects light of a second polarity to the mirror, and the polarizing beam-splitter reflects light from the mirror to the light source.

Alternatively, the polarizing beam-splitter reflects light of a first polarity to the selectably actuable polarization rotating light valve and transmits light of a second polarity to the mirror, and the polarizing beam-splitter transmits light from the mirror to the light source.

Additionally, in accordance with a preferred embodiment of the present invention there is provided a color display comprising:

a non-polarized light source;

at least one polarizing beam-splitter receiving light from the non-polarized light source;

first and second selectably actuable polarization rotating light valves having impinging thereon light from the polarizing beam splitter and operating in a reflective mode;

a display screen including a plurality of differently colored light impingement regions; and imaging optics for directing light reflected from the first and second light valves via the at least one beam-splitter to the display screen, wherein the first light valve is operative to modulate a first image corresponding to a right eye image of a stereo image and the second light valve is operative to modulate a second image corresponding to a left eye image of a stereo image.

Preferably, the at least one polarizing beam splitter polarizes the light in mutually orthogonal directions.

According to a preferred embodiment of the present invention, the wherein the first image is time interlaced with the second image.

There is also provided a color display comprising:

a non-polarized light source;

at least one polarizing beam-splitter receiving light from the non-polarized light source;

first and second selectably actuable polarization rotating light valves having impinging thereon light from the polarizing beam splitter and operating in a reflective mode;

a display screen including a plurality of differently colored light impingement regions; and imaging optics for directing light reflected from the first and second light valves via the at least one beam-splitter to the display screen, wherein the first light valve is operative to modulate a first image portion and the second light valve is operative to modulate a second image portion interlaced with the first image portion.

BRIEF DESCRIPTION OF THE DRAWINGS

The present invention will be understood and appreciated more fully from the following detailed description, taken in conjunction with the drawings in which:

FIG. 2 is a simplified illustration of generation of a colored display image from a projected polychromatic beam in accordance with a preferred embodiment of the present invention;

FIGS. 6 and 7 are simplified illustrations of part of the optics of the display of FIGS. 1A, 1B and 2 in accordance with two alternative embodiments of the present invention which employ a single light valve.

DETAILED DESCRIPTION OF A PREFERRED EMBODIMENT

Figure 1A:
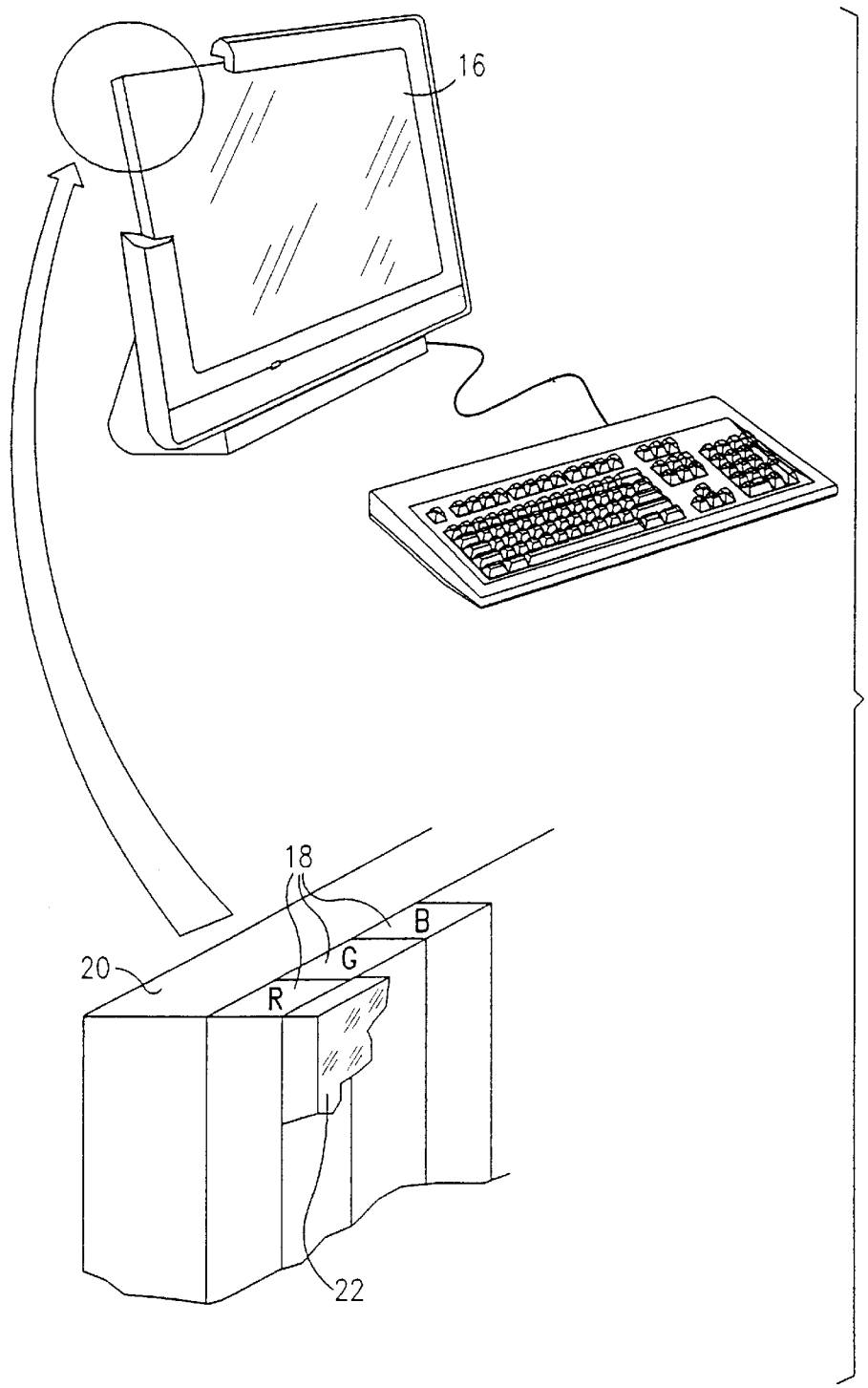
FIGS. 1A and 1B are partially cut away front and back view pictorial illustrations of a color display constructed and operative in accordance with a preferred embodiment of the present invention.
Figure 1B:
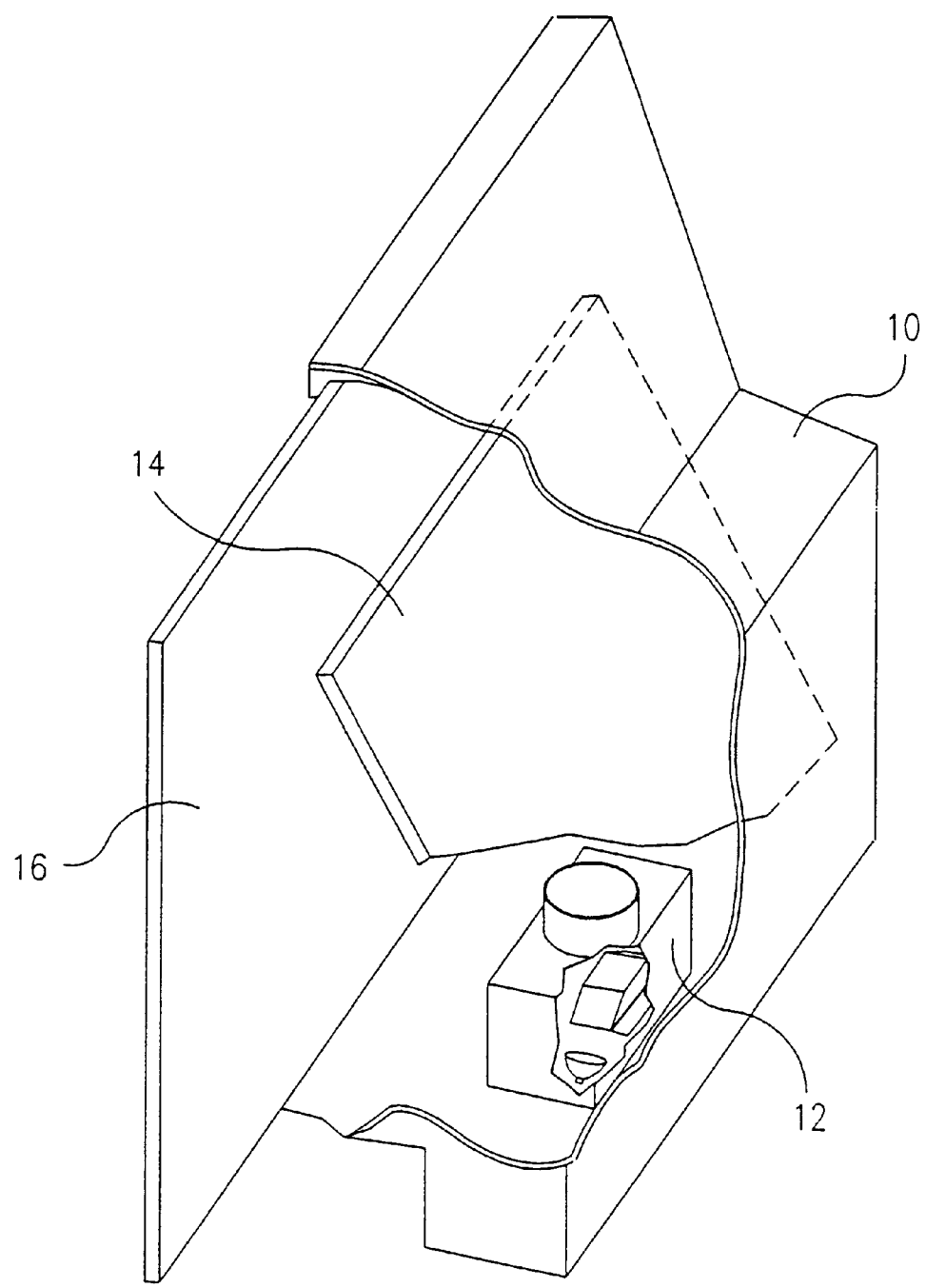

Reference is now made to FIGS. 1A and 1B, which are partially cut away front and back view pictorial illustrations of a color display constructed and operative in accordance with a preferred embodiment of the present invention.

As can be seen from FIGS. 1A and 1B, the display of the present invention is relatively shallow as compared with conventional CRT displays and includes a housing 10, which encloses a projection module 12, a folding mirror 14 and a display screen 16, including a plurality of differently colored light impingement regions, typically red, green and blue strips 18 formed over a transparent substrate 20 and covered, preferably, by a protective anti-glare layer 22.

It is a particular feature of the invention that the projection module 12 projects polychromatic light, generally white light, onto the screen 16. Impingement of light on each of the differently colored light impingement regions 18 produces a colored light output originating from the screen.

The presence of differently colored light impingement regions 18 causes relatively little ambient light to be reflected from the screen. The fact that the screen is made up of such differently colored light impingement regions, aided by the presence of the anti-glare layer 22, causes specular reflection from the screen 16 to be minimal, thus producing a display which is comfortable to the eyes of the user.

Reference is now made to FIG. 2, which is a simplified illustration of generation of a colored display image from a projected polychromatic light beam in accordance with a preferred embodiment of the present invention. FIG. 2 illustrates the creation of a colored display image 30 of a symbol, such as the letter A, from a corresponding image 32 formed by an addressable multi-pixel light valve 34, such as a black-and-white reflective LCD.

In accordance with a preferred embodiment of the present invention, image 32 formed on light valve 34 is built up of a multiplicity of pixels 36, each of which includes typically three sub-pixels 38, 40 and 42, corresponding to basic colors red, green and blue. Thus, each pixel contains in respective sub-pixels 38, 40 and 42 information relating to the respective red, green and blue color content of each pixel.

As will be described hereinbelow in greater detail, polychromatic light is image-wise reflected by light valve 42 and projected onto a display screen 44 which includes a plurality of differently colored light impingement regions 46, 48 and 50, typically red, green and blue strips 18. Light from the various sub-pixels of the image 32 on light valve 42 which correspond to the three basic colors is optically aligned such light from each sub pixel impinges on a colored region corresponding thereto.

Display screen 44 is preferably transmissive, although it could alternatively be reflective. Using a transmissive display screen, the light impinging on each colored region 46, 48 and 50 is filtered as it passes therethrough, thus creating a composite colored image.

It is appreciated that the dimensions of the individual colored light impingement regions are preferably sufficiently small such that when the screen is viewed at a normal viewing distance, the viewer cannot distinguish the individual colored light impingement regions but rather sees a continuous colored image. It is further appreciated that the shape and mutual arrangement of the individual colored light impingement regions may be any suitable shape and arrangement and need not necessarily includes strips as shown.

It is a further particular feature of the present invention that the geometric definition of the individual colored light impingement regions on the screen decreases the amount of blurring that would otherwise occur due to spreading of the projected light from the sub-pixels of image 32, thus providing a relatively sharp image, which is particularly important for display of alphanumeric information and drawings.

Figure 3:
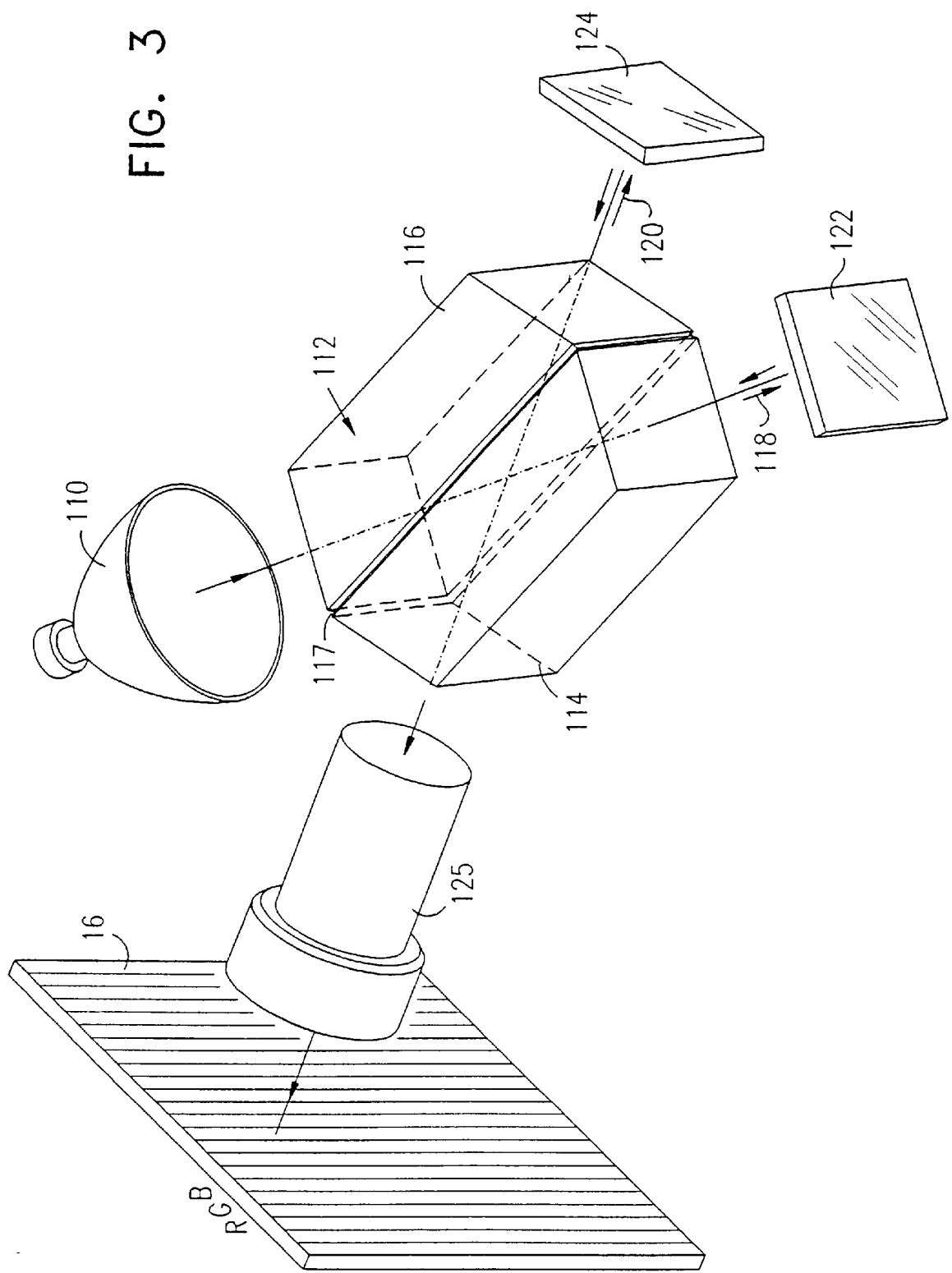
FIG. 3 is a simplified illustration of part of the optics of the display of FIGS. 1A, 1B and 2 in accordance with one preferred embodiment of the present invention which employs two light valves.

Reference is now made to FIG. 3, which is a simplified illustration of the projection module 12 of the display of FIGS. 1A, 1B and 2 in accordance with one preferred embodiment of the present invention. The projection module 12 (FIG. 1B) preferably comprises a non-polarized light source 110, such as an arc lamp based or a tungsten-halogen illuminator, which directs a beam of light onto a polarizing beam splitter/combiner 112.

Preferably, the polarizing beam splitter/combiner 112 comprises first and second prisms 114 and 116 separated by a liquid crystal material 117. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 112 is operative to split the light impinging thereon from light source 110 into two preferably differently polarized beams, 118 and 120. In accordance with a preferred embodiment of the present invention, beam 118, which is transmitted by liquid crystal material 117, impinges on a first selectably actuable polarization rotating light valve 122 operating in a reflective mode. An example of a suitable light valve is a conventional reflective LCD without a polarizer. Further, in accordance with this preferred embodiment of the invention, beam 120, which is reflected by the liquid crystal material 117, impinges on a second selectably actuable polarization rotating light valve 124 operating in a reflective mode, which is preferably identical to light valve 122.

The first selectably actuable polarization rotating light valve 122 thus receives light of a first polarity from the polarizing beam splitter 112, while the second selectably actuable polarization rotating light valve 124 receives light of a second polarity, typically, but not necessarily, orthogonal to said first polarity, from the polarizing beam splitter 112.

In accordance with a preferred embodiment of the present invention modulated light reflected from the selectably actuable light valves 122 and 124 is reflected by the beam splitter 112 via an objective lens 125 which outputs the modulated light beam onto screen 16 (FIG. 1)

The present invention, a preferred embodiment of which is described hereinabove, has a number of advantages over the prior art:

It utilizes both polarized components of the light from the light source as well as the full spectrum of the light. Thus, the percentage of the light emitted by the light source that is outputted exceeds that conventionally realized in the prior art.

The use of reflective light valves provides greater efficiency than would be achieved using transmissive light valves since it avoids the obscuration produced by the black matrix of the transistors used therein and shortens the optical path. Also, the utilization of a polarizing beam splitter obviates the need for polarizers usually associated with a liquid crystal light valve.

Operation in a reflective mode enables the beam splitters to be used as beam combiners, thus reducing the number of components and the overall size and weight of the display.

The first light valve 122 may be operative to modulate an image intended for a viewer's left eye, while the second light valve 124 may be operative to modulate an image intended for a viewer's right eye, or vice versa.

The combined image projected via the objective lens 125 appears on screen 16 (FIG. 1) as two mutually orthogonally polarized images. A viewer, wearing glasses having left and right lenses having mutually orthogonal polarization, sees the image, here the letter "A", in three dimensions, as if it were coming out of the screen 16.

In an alternative embodiment of the invention wherein time-interlaced stereo projection is provided, the glasses may contain time-interlaced shutters for enabling different eyes of the viewer to see different images.

The first light valve 122 may be operative to modulate a first spaced series of lines of an image, while the second light valve 124 may be operative to modulate a second spaced series of lines of the image, interlaced with the first series of lines.

The combined image projected via the objective lens 125 appears on screen 16 (FIG. 1) as a combined interlaced image. It is appreciated that the lines need not be vertical as shown, but may instead be horizontal or in any other suitable interlaced pattern. It is also appreciated that the above-described features may be readily combined to provide interlaced three-dimensional projection.

Figure 4:
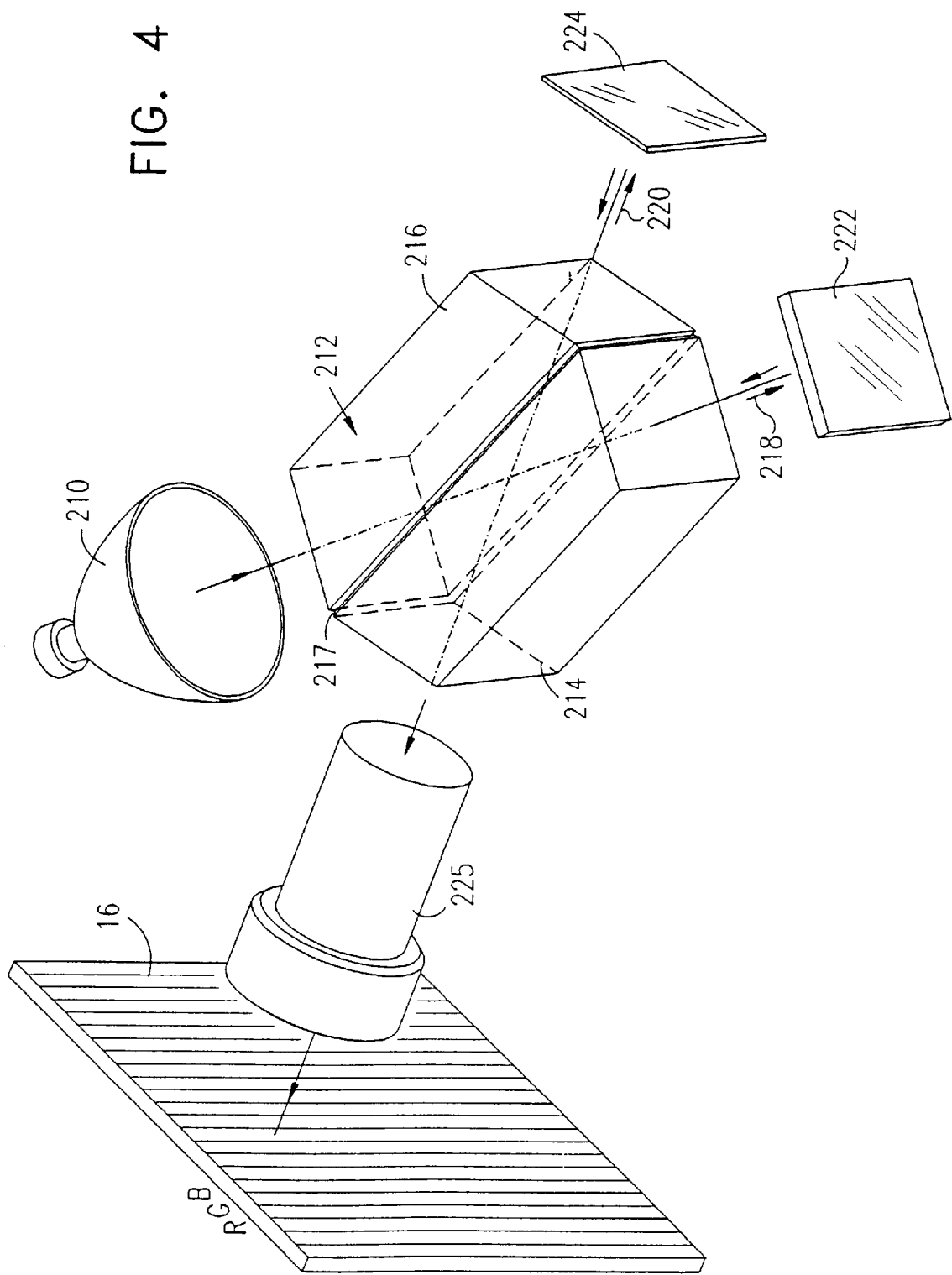
FIGS. 4 and 5 are simplified illustrations of part of the optics of the display of FIGS. 1A, 1B and 2 in accordance with two alternative embodiments of the present invention which employ one light valve and a mirror.

Reference is now made to FIG. 4, which is a simplified illustration of the projection module 12 of the display of FIGS. 1A, 1B and 2 in accordance with another preferred embodiment of the present invention. The projection module 12 (FIG. 1B) preferably comprises a non-polarized light source 210, such as an arc lamp based or a tungsten-halogen illuminator, which directs a beam of light onto a polarizing beam splitter/combiner 212.

Preferably, the polarizing beam splitter/combiner 212 comprises first and second prisms 214 and 216 separated by a liquid crystal material 217. Alternatively, the polarizing beam splitter may comprise Glen-Thompson or Wollaston prisms which are commercially available from Melles Griot or Spindler & Hoyer. As a further alternative, the polarizing beam splitter may be a conventional broad-band polarizing beam splitter comprising plural prisms which are separated by multilayer optical coatings.

The polarizing beam splitter 212 is operative to split the light impinging thereon from light source 210 into two preferably differently polarized beams, 218 and 220. In accordance with a preferred embodiment of the present invention, beam 218, which is transmitted by liquid crystal material 217, impinges on a selectably actuable polarization rotating light valve 222 operating in a reflective mode. An example of a suitable light valve is a conventional reflective LCD without a polarizer. Further in accordance with this preferred embodiment of the invention, beam 220, which is reflected by the liquid crystal material 217, impinges on a mirror 224.

The selectably actuable polarization rotating light valve 222 thus receives light of a first polarity from the polarizing beam splitter 212, while the mirror 224 receives light of a second polarity, typically, but not necessarily, orthogonal to said first polarity, from the polarizing beam splitter 222.

In accordance with a preferred embodiment of the present invention modulated light reflected from the selectably actuable light valve 222 is reflected by the beam splitter 212 via an objective lens 225 which outputs the modulated light beam onto screen 16 (FIG. 1)

It is a particular feature of the present invention that light of a second polarity is reflected by mirror 224 back to the beam splitter 212 which reflects it back to the light source 210, which is operative to at least partially depolarize such light, converting at least part of it to light of a first polarity, which is then modulated by light valve 222 and output via objective lens 225.

The depolarization of the light of the second polarity has the advantages of providing significantly higher light efficiency while providing corresponding lower heating of the projector from absorbed light.

Figure 5:
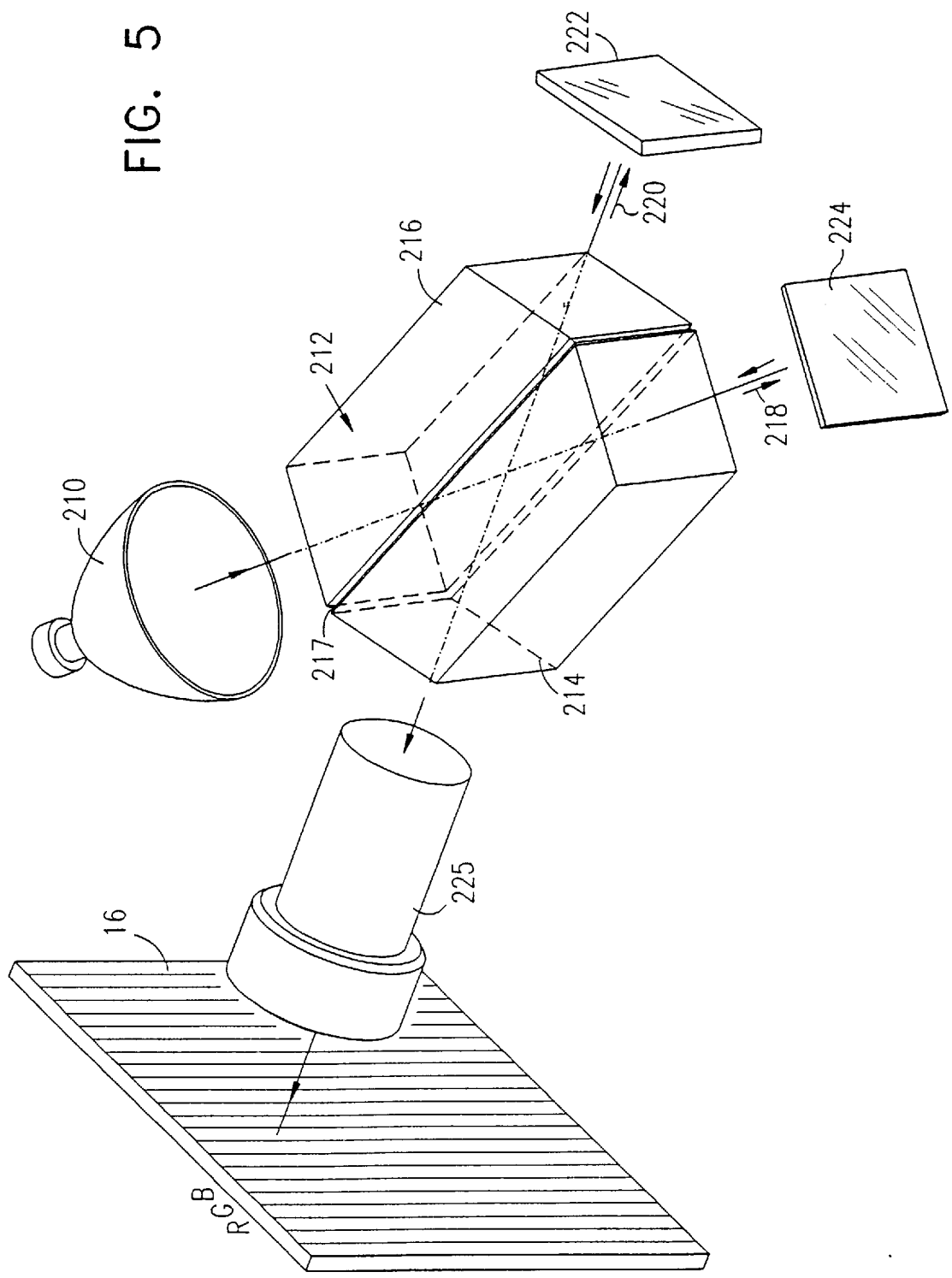

Reference is now made to FIG. 5, which illustrates a variation of the structure shown in FIG. 4, in which the positions of the light valve 222 and of the mirror 224 are reversed. Normally, the embodiment of FIG. 4 is preferred, however the embodiment of FIG. 5 is clearly within the scope of the present invention.

Reference is now made to FIG. 6, which illustrates a further variation of the structure shown in FIGS. 3–5, in which the second light valve or the mirror are eliminated and only a single light valve is provided. Thus the light of a second polarity is not utilized. Normally, the embodiments of FIGS. 3–5 are preferred, however the embodiment of FIG. 6 is clearly within the scope of the present invention.

Reference is now made to FIG. 7, which illustrates a variation of the structure shown in FIG. 6, in which the position of a single light valve 322 is shifted so that it only receives light transmitted through a polarizing beam splitter 324 and the light reflected by the polarizing beam splitter 324 is not utilized. Normally, the embodiments of FIGS. 3–5 are preferred, however the embodiment of FIG. 7 is clearly within the scope of the present invention.

The present invention, a preferred embodiment of which is described hereinabove, has a number of advantages over the prior art:

In most cases it utilizes both polarized components of the light from the light source. Thus, the percentage of the light emitted by the light source that is outputted exceeds that conventionally realized in the prior art.

The use of reflective light valves provides greater efficiency than would be achieved using transmissive light valves since it avoids the obscuration produced by the black matrix of the transistors used therein and shortens the optical path. Also, the utilization of a polarizing beam splitter obviates the need for polarizers usually associated with a liquid crystal light valve.

Operation in a reflective mode enables the beam splitters to be used as beam combiners, thus reducing the number of components and the overall size and weight of the display.

The first light valve 222 may be operative to modulate an image intended for a viewer's left eye, while the second light valve 224 may be operative to modulate an image intended for a viewer's right eye, or vice versa.

The combined image projected via the objective lens 225 appears on screen 16 (FIG. 1) as two mutually orthogonally polarized images. A viewer, wearing glasses having left and right lenses having mutually orthogonal polarization, sees the image, here the letter "A", in three dimensions, as if it were coming out of the screen 16.

In an alternative embodiment of the invention wherein time-interlaced stereo projection is provided, the glasses may contain time-interlaced shutters for enabling different eyes of the viewer to see different images.

The first light valve 222 may be operative to modulate a first spaced series of lines of an image, while the second light valve 224 may be operative to modulate a second spaced series of lines of the image, interlaced with the first series of lines.

The combined image projected via the objective lens 225 appears on screen 16 (FIG. 1) as a combined interlaced image. It is appreciated that the lines need not be horizontal as shown, but may instead be vertical or in any other suitable interlaced pattern. It is also appreciated that the above-described features may be readily combined to provide interlaced three-dimensional projection.

FIGS. 4 and 5 are simplified illustrations of part of the optics of the display of FIGS. 1A, 1B and 2 in accordance with two alternative embodiments of the present invention which employ one light valve and a mirror; and FIGS. 6 and 7 are simplified illustrations of part of the optics of the display of FIGS. 1A, 1B and 2 in accordance with two alternative embodiments of the present invention which employ a single light valve.

It will be appreciated by persons skilled in the art that the present invention is not limited by what has been particularly shown and described hereinabove. Rather the scope of the present invention include both combinations and sub-combinations of the various features described hereinabove as well as variations and modifications of such features as would occur to a person skilled in the art upon reading the description and which are not in the prior art.

I claim:

1. A color display comprising:
   a non-polarized light source;
   at least one polarizing beam-splitter receiving light from said non-polarized light source;
   at least one selectably actuable polarization rotating light valve having thereon impinging light from the polarizing beam splitter and operating in a reflective mode, said light valve having a plurality of separately controlled light valve regions which correspond to different colors;
   a display screen including a plurality of differently colored light impingement regions; and
   imaging optics for directing light reflected from said at least one light valve via said at least one beam-splitter to said display screen such that light from individual ones of said plurality of separately controlled light valve regions which correspond to a given color impinges on correspondingly colored light impingement regions of said display screen.

2. A color display according to claim 1 and wherein said imaging optics is operative to direct polychromatic light reflected from said at least one light valve via said at least one beam-splitter to said display screen such that polychromatic light from individual ones of said plurality of separately controlled light valve regions which correspond to a given color impinges on correspondingly colored light impingement regions of said display screen.

3. A color display according to claim 2 and wherein:
   said at least one polarizing beam-splitter comprises a single polarizing beam-splitter;
   said at least one selectably actuable polarization rotating light valve comprises a single selectably actuable polarization rotating light valve;
   said polarizing beam-splitter transmits light of a first polarity to said selectably actuable polarization rotating light valve and reflects light of a second polarity to a mirror; and
   said polarizing beam-splitter reflects light from said mirror to said light source.

4. A color display according to claim 2 and wherein:
   said at least one polarizing beam-splitter comprises a single polarizing beam-splitter;
   said at least one selectably actuable polarization rotating light valve comprises a single selectably actuable polarization rotating light valve;
   said polarizing beam-splitter reflects light of a first polarity to said selectably actuable polarization rotating light valve and transmits light of a second polarity to a mirror; and
   said polarizing beam-splitter transmits light from said mirror to said light source.

5. A color display according to claim 2 and wherein:
   said at least one polarizing beam-splitter comprises a single polarizing beam-splitter;
   said at least one selectably actuable polarization rotating light valve comprises a single selectably actuable polarization rotating light valve;
   said single polarizing beam-splitter directs light of a first polarity to said single selectably actuable polarization rotating light valve and directs light of a second polarity to a mirror;
   said mirror reflects said light of said second polarity to said polarizing beam-splitter which directs it back to said light source; and
   said light source at least partially depolarizes said light of said second polarity.

6. A color display according to claim 1 and wherein:
   said at least one polarizing beam-splitter comprises a single polarizing beam-splitter;
   said at least one selectably actuable polarization rotating light valve comprises a single selectably actuable polarization rotating light valve;
   said single polarizing beam-splitter directs light of a first polarity to said single selectably actuable polarization rotating light valve and directs light of a second polarity to a mirror;
   said mirror reflects said light of said second polarity to said polarizing beam-splitter which directs it back to said light source; and
   said light source at least partially depolarizes said light of said second polarity.

7. A color display according to claim 1 and wherein:
   said at least one polarizing beam-splitter comprises a single polarizing beam-splitter;
   said at least one selectably actuable polarization rotating light valve comprises a single selectably actuable polarization rotating light valve;
   said polarizing beam-splitter transmits light of a first polarity to said selectably actuable polarization rotating light valve and reflects light of a second polarity to a mirror; and
   said polarizing beam-splitter reflects light from said mirror to said light source.

8. A color display according to claim 1 and wherein:

said at least one polarizing beam-splitter comprises a single polarizing beam-splitter;

said at least one selectably actuable polarization rotating light valve comprises a single selectably actuable polarization rotating light valve;

said polarizing beam-splitter reflects light of a first polarity to said selectably actuable polarization rotating light valve and transmits light of a second polarity to a mirror; and said polarizing beam-splitter transmits light from said mirror to said light source.

9. A color display method comprising the steps of:

directing light from a non-polarized light source via at least one polarizing beam-splitter onto at least one selectably actuable polarization rotating light valve having thereon impinging light from the polarizing beam splitter and operating in a reflective mode, said light valve having a plurality of separately controlled light valve regions which correspond to different colors; and directing light reflected from said at least one light valve via said at least one beam-splitter to a display screen including a plurality of differently colored light impingement regions such that light from individual ones of said plurality of separately controlled light valve regions which correspond to a given color impinges on correspondingly colored light impingement regions of said display screen.

10. A color display method according to claim 9 and wherein polychromatic light is reflected from said at least one light valve via said at least one beam-splitter to said display screen such that polychromatic light from individual ones of said plurality of separately controlled light valve regions which correspond to a given color impinges on correspondingly colored light impingement regions of said display screen.

11. A color display method according to claim 10 and wherein:

said at least one polarizing beam-splitter comprises a single polarizing beam-splitter;

said at least one selectably actuable polarization rotating light valve comprises a single selectably actuable polarization rotating light valve;

said polarizing beam-splitter transmits light of a first polarity to said selectably actuable polarization rotating light valve and reflects light of a second polarity to a mirror; and said polarizing beam-splitter reflects light from said mirror to said light source.

12. A color display method according to claim 10 and wherein:

said at least one polarizing beam-splitter comprises a single polarizing beam-splitter;

said at least one selectably actuable polarization rotating light valve comprises a single selectably actuable polarization rotating light valve;

said polarizing beam-splitter reflects light of a first polarity to said selectably actuable polarization rotating light valve and transmits light of a second polarity to a mirror; and said polarizing beam-splitter transmits light from said mirror to said light source.

13. A color display method according to claim 10 and wherein:

said at least one polarizing beam-splitter comprises a single polarizing beam-splitter;

said at least one selectably actuable polarization rotating light valve comprises a single selectably actuable polarization rotating light valve;

said single polarizing beam-splitter directs light of a first polarity to said single selectably actuable polarization rotating light valve and directs light of a second polarity to a mirror;

said mirror reflects said light of said second polarity to said polarizing beam-splitter which directs it back to said light source; and said light source at least partially depolarizes said light of said second polarity.

14. A color display method according to claim 9 and wherein:

said at least one polarizing beam-splitter comprises a single polarizing beam-splitter;

said at least one selectably actuable polarization rotating light valve comprises a single selectably actuable polarization rotating light valve;

said single polarizing beam-splitter directs light of a first polarity to said single selectably actuable polarization rotating light valve and directs light of a second polarity to a mirror;

said mirror reflects said light of said second polarity to said polarizing beam-splitter which directs it back to said light source; and said light source at least partially depolarizes said light of said second polarity.

15. A color display method according to claim 9 and wherein:

said at least one polarizing beam-splitter comprises a single polarizing beam-splitter;

said at least one selectably actuable polarization rotating light valve comprises a single selectably actuable polarization rotating light valve;

said polarizing beam-splitter transmits light of a first polarity to said selectably actuable polarization rotating light valve and reflects light of a second polarity to a mirror; and said polarizing beam-splitter reflects light from said mirror to said light source.

16. A color display method according to claim 9 and wherein:

said at least one polarizing beam-splitter comprises a single polarizing beam-splitter;

said at least one selectably actuable polarization rotating light valve comprises a single selectably actuable polarization rotating light valve;

said polarizing beam-splitter reflects light of a first polarity to said selectably actuable polarization rotating light valve and transmits light of a second polarity to a mirror; and said polarizing beam-splitter transmits light from said mirror to said light source.

17. A color display comprising:

a non-polarized light source;

at least one polarizing beam-splitter receiving light from said non-polarized light source;

first and second selectably actuable polarization rotating light valves having thereon impinging light from the polarizing beam splitter and operating in a reflective mode;

a display screen including a plurality of differently colored light impingement regions; and imaging optics for directing light reflected from said first and second light valves via said at least one beam-splitter to said display screen, wherein said first light valve is operative to modulate a first image corresponding to a right eye image of a stereo image and said second light valve is operative to modulate a second image corresponding to a left eye image of a stereo image.

18. A color display according to claim 17 and wherein said at least one polarizing beam splitter polarizes said light in mutually orthogonal directions.

19. A color display according to claim 17 and wherein said first image is time interlaced with said second image.

20. A color display comprising:

a non-polarized light source;

at least one polarizing beam-splitter receiving light from said non-polarized light source;

first and second selectably actuable polarization rotating light valves having thereon impinging light from the polarizing beam splitter and operating in a reflective mode;

a display screen including a plurality of differently colored light impingement regions; and imaging optics for directing light reflected from said first and second light valves via said at least one beam-splitter to said display screen, wherein said first light valve is operative to modulate a first image portion and said second light valve is operative to modulate a second image portion interlaced with said first image portion.

* * * * *